United States Patent
Danilov et al.

(10) Patent No.: US 10,346,299 B1
(45) Date of Patent: Jul. 9, 2019

(54) REFERENCE TRACKING GARBAGE COLLECTION FOR GEOGRAPHICALLY DISTRIBUTED STORAGE SYSTEM

(71) Applicant: EMC IP Holding Company LLC, Hopkinton, MA (US)

(72) Inventors: Mikhail Danilov, Saint Petersburg (RU); Gregory Skripko, Seattle, WA (US); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/784,317

(22) Filed: Oct. 16, 2017

(51) Int. Cl.
*G06F 12/02* (2006.01)

(52) U.S. Cl.
CPC .. *G06F 12/0261* (2013.01); *G06F 2212/1044* (2013.01); *G06F 2212/154* (2013.01)

(58) Field of Classification Search
CPC .... G06F 16/182; G06F 3/0647; G06F 16/316; G06F 3/061; G06F 11/1076; G06F 3/067; G06F 17/30; G06F 3/06

USPC .................................................. 711/108, 170
See application file for complete search history.

(56) References Cited

U.S. PATENT DOCUMENTS

| 9,396,242 B2 * | 7/2016 | Varley ............... G06F 17/30575 |
| 9,996,562 B2 * | 6/2018 | Higginson ............ G06F 16/214 |
| 2016/0088077 A1 * | 3/2016 | Liu ..................... H04L 67/1095 709/203 |

* cited by examiner

*Primary Examiner* — Pierre Miche Bataille
(74) *Attorney, Agent, or Firm* — Amin, Turocy & Watson, LLP

(57) ABSTRACT

The described technology is generally directed towards reference tracking garbage collection, including for operating in a geographically distributed storage system. Content Addressed Storage (CAS) data objects comprising BLOBs (Binary Large Objects) are referenced by data objects comprising C-Clip Descriptor Files (CDFs). BLOBs having no remaining reference, referred to as orphan BLOBs, are deleted in a two-stage deletion operation that ensures that no new reference has been created. An alive BLOB that became an orphan is demoted to a garbage collection candidate with limited access to the BLOB. The BLOB is only deleted if the garbage collection candidate status of the BLOB is distributed across geographically distributed zones, and there is no new reference to the BLOB.

20 Claims, 13 Drawing Sheets

# REFERENCE TRACKING GARBAGE COLLECTION FOR GEOGRAPHICALLY DISTRIBUTED STORAGE SYSTEM

TECHNICAL FIELD

The subject application relates to data storage; e.g., data storage in which objects may reference each other, and to reference tracking garbage collection including in a geographically distributed storage system, and related embodiments.

BACKGROUND

Content Addressed Storage (CAS) systems store data objects referred to as Binary Large Objects, (BLOBs), which are referenced by data objects of a different type, referred to as C-Clip Descriptor Files (CDFs). In general, with CAS, a hash computation of the object's content provides the address for accessing the data object's content, with the address stored in a directory or the like for subsequent access.

One cloud-based storage system that supports CAS is Dell EMC® Elastic Cloud Storage (ECS™). ECS™ is a cloud storage technology that assures strong consistency of user data, including by supporting geographically distributed setups (sometimes referred to as "GEO" for short) comprising two or more zones, in which each zone is normally an ECS™ cluster. Each data object (e.g., including a BLOB or a CDF) is owned by exactly one zone. User data, the related user metadata, and some system metadata are synchronized between zones by means of asynchronous low level (that is, not object level) replication. This allows access to an object even when the zone that owns the object is not available because of temporary zone outage.

There are problems with garbage collection of BLOBs in a geographically distributed storage system. These include garbage collection issues related to temporary zone outages, and garbage collection issues related to ensuring that data loss cannot occur.

SUMMARY

Briefly, one or more aspects of the technology described herein are directed towards, in a geographically distributed data storage system comprising geographically distributed zones, detecting, in a geographically distributed zone of the geographically distributed zones by a system comprising a processor, a binary large object that has no remaining reference to the binary large object. Aspects comprise associating the binary large object with a garbage collection candidate object state and deleting the binary large object associated with the garbage collection candidate object state after replicating the garbage collection candidate object state of the binary large object to each geographically distributed zone other than the geographically distributed zone and determining that the binary large object has not obtained a new reference to the binary large object.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
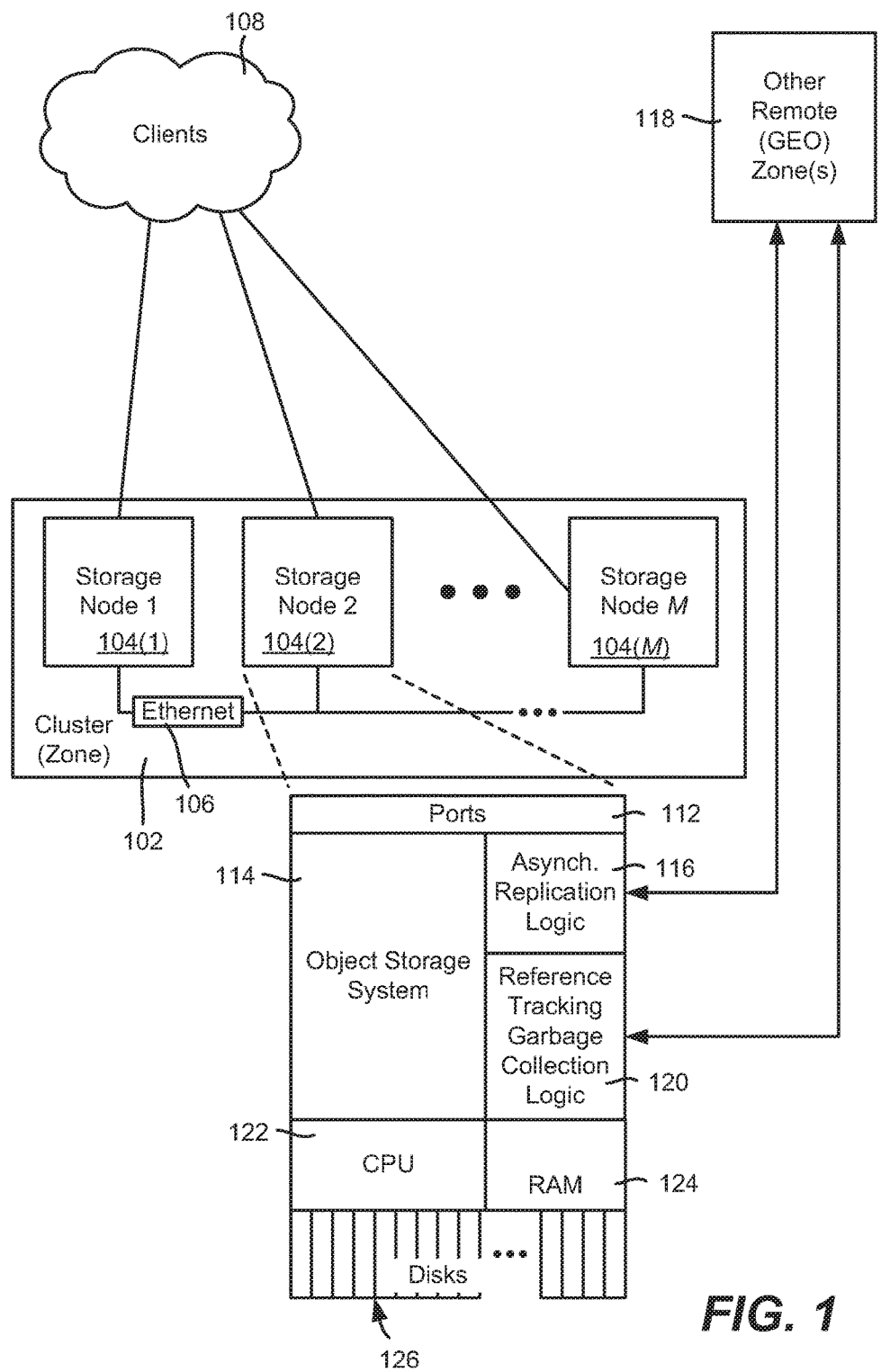
FIG. 1 is an example block diagram representation of part of a cloud data storage system including zones, in which reference tracking garbage collection logic processes data objects, according to one or more example implementations.

Various aspects of the technology described herein are generally directed towards garbage collection in data storage, such as in Dell EMC® Elastic Cloud Storage™ (ECS™) that stores data in geographically distributed zones. In general, the technology is directed towards reference tracking garbage collection for implementations of Content Addressed Storage (CAS), which works efficiently and reliably in a geographically distributed environment.

One technology for garbage collection of BLOBs is based on reference tracking, in which CDF references to a BLOB are tracked, and when a given BLOB loses its references, the BLOB becomes an "orphan," which can be deleted to reclaim the capacity the orphaned BLOB occupies. However, one problem is that a BLOB can become an orphan only momentarily, in that the BLOB can be referenced by a new CDF as a result of concurrent CDF deletes and writes. Such a scenario is even more probable in a multiple zone setup.

To prevent possible data loss, one solution is that when a CDF references a non-existent BLOB, each BLOB referenced by a new CDF needs to be updated with a new reference to the BLOB in the foreground of the CDF write transaction. However, such a solution impacts storage performance severely, particularly with multiple zones. For example, consider two zones, in which a first zone writes a new CDF, which references 100,000 BLOBs, each of which are owned by a second (remote) zone. From the client perspective, creation of such a CDF, which is on the order to ten to twenty megabytes in size, takes a relatively huge amount of time because the client does not get an acknowledgement until the first zone updates the system metadata of the 100,000 remotely owned BLOBs.

Another problem is operability during a temporary zone outage. By way of example, consider again a two-zone setup, in which a first zone is used to write a new CDF, which references a BLOB owned by a second (remote) zone that is temporarily unavailable. One possible solution is to have the first zone simply fail to write such a CDF; however such inoperability of CAS during a zone outage is not acceptable for most CAS customers. Another possible solution would be to let the first zone obtain ownership of the BLOB and update its system metadata as if the BLOB has been created locally. However, there is a chance that the BLOB object already had been deleted along with its content by the second zone, which (because of asynchronous low level replication that would replicate the deletion) would result in data loss.

In one or more aspects, and as will be understood, the technology described herein is based on a two-stage deletion of orphan Binary Large Objects, or BLOBs. In a first stage, an alive BLOB, which became an orphan, is demoted to a garbage collection candidate; (in this state there is limited access to the BLOB). The technology ensures that the garbage collection candidate status of the BLOB is distributed across a geographically distributed setup. In a second stage, after a sufficient time that ensures the BLOB has not obtained one or more new references to the BLOB, the BLOB is actually deleted (swept) from the system. The implementation of two-stage deletion together with the way the storage system handles other events, e.g., creation and deletion of reference objects (e.g., C-Clip Descriptor Files, or CDFs), avoids possible data loss while allowing efficient creation of new CDFs, e.g., without the need for updating each BLOB referenced by a new CDF in the foreground of the new CDF write transaction.

It should be understood that any of the examples herein are non-limiting. For instance, some of the examples are based on ECS™ cloud storage technology, which supports objects corresponding to reference objects (the CDFs) and BLOBs maintained in the Dell-EMC Centera® CAS system; however virtually any storage system may benefit from the technology described herein. Thus, any of the embodiments, aspects, concepts, structures, functionalities or examples described herein are non-limiting, and the technology may be used in various ways that provide benefits and advantages in computing and data storage in general.

FIG. 1 shows part of a cloud data storage system such as ECS™ comprising a zone (e.g., cluster) 102 of storage nodes 104(1)-104(M), in which each node is typically a server configured primarily to serve objects in response to client requests. The nodes 104(1)-104(M) are coupled to each other via a suitable data communications link comprising interfaces and protocols such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of an object storage system 114 and data services. For a cluster that comprises a "GEO" zone of a geographically distributed storage system, at least one node, such as the node 104(2), includes or coupled to reference tracking asynchronous replication logic 116 that synchronizes the cluster/zone 102 with each other remote GEO zone 118. Note that ECS™ implements asynchronous low level replication, that is, not object level replication.

In a GEO system, each cluster/zone (such as via logic in at least one node, such as the node 104(2)), includes or coupled to reference tracking copying garbage collection logic 116 as described herein. A CPU 122 and RAM 124 are shown for completeness; note that the RAM 120 may comprise at least some non-volatile RAM. The node includes storage devices such as disks 126, comprising hard disk drives and/or solid-state drives.

BLOB objects are referenced by reference objects, comprising CDFs in one or more implementations. With respect to CDF creation, recall that in other technologies, each BLOB referenced by a new CDF was updated with a new reference to the BLOB in the foreground of the CDF write transaction, which often was an unacceptably slow operation. The technology described herein instead provides a check for each referenced BLOB's existence in the foreground of the transaction, which guarantees CAS data integrity. Note that as described herein, the check for existence fails for BLOBs that are garbage collection candidates, that is, for any BLOB that has metadata indicating the BLOB is in the garbage collection candidate state.

Figure 2:
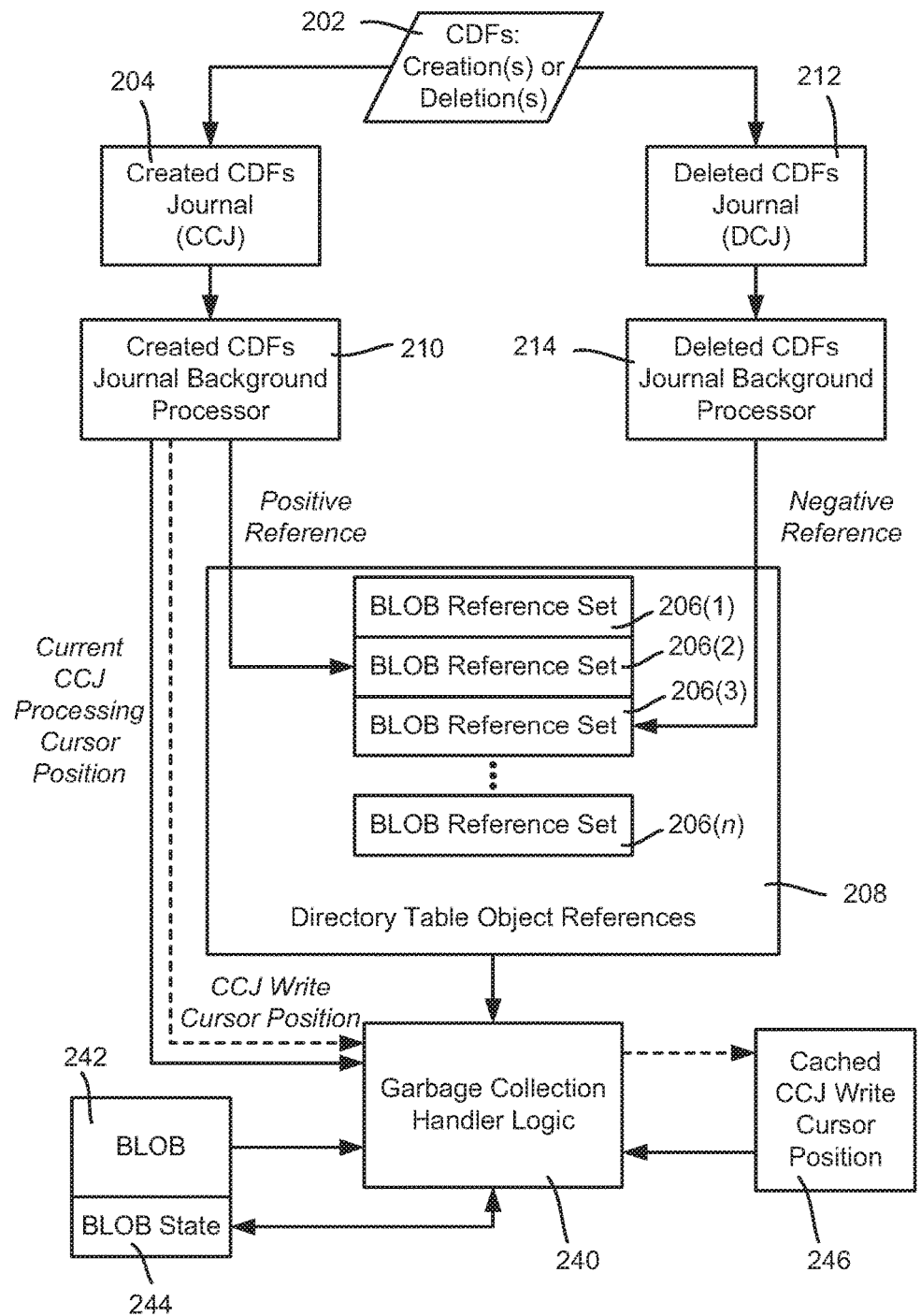
FIG. 2 is an example block/data operation diagram representation of journals, journal processing and garbage collection handler logic, according to one or more example implementations.

FIG. 2 generally represents how the storage system technology described herein handles CDF creation and deletion (creations and deletion operations/events are represented by block 202). When created, an entry for a created CDF is added to a created CDFs journal (CCJ) 204.

BLOB reference sets 206(1)-206(n) that track BLOB references are maintained within a directory table object references data structure 208. In one or more implementations, in a background mode a created CDFs journal background processor 210 extracts BLOB references from the CDF and stores them in relevant one(s) of the BLOB reference sets in the object references table 208. Note that a new CDF needs to be added to the created CDFs journal 204 before performing any check for a BLOB's existence.

With respect to CDF deletion, note that a CDF is not physically deleted until its processing is completed. For deletions, an entry representing the CDF is added to a deleted CDFs journal (DCJ) 212.

BLOB references from the deleted CDF are similarly processed in a background mode. More particularly, a deleted CDFs journal background processor 214 extracts BLOB reference(s) from the deleted CDF and update relevant one(s) of the BLOBs in the object references table 208. Note that deleted CDFs journal processing is not considered to be a critical operation from garbage collection point of view, as with garbage collection what matters is not missing new references, which come from the created CDFs journal 204.

Figure 3:
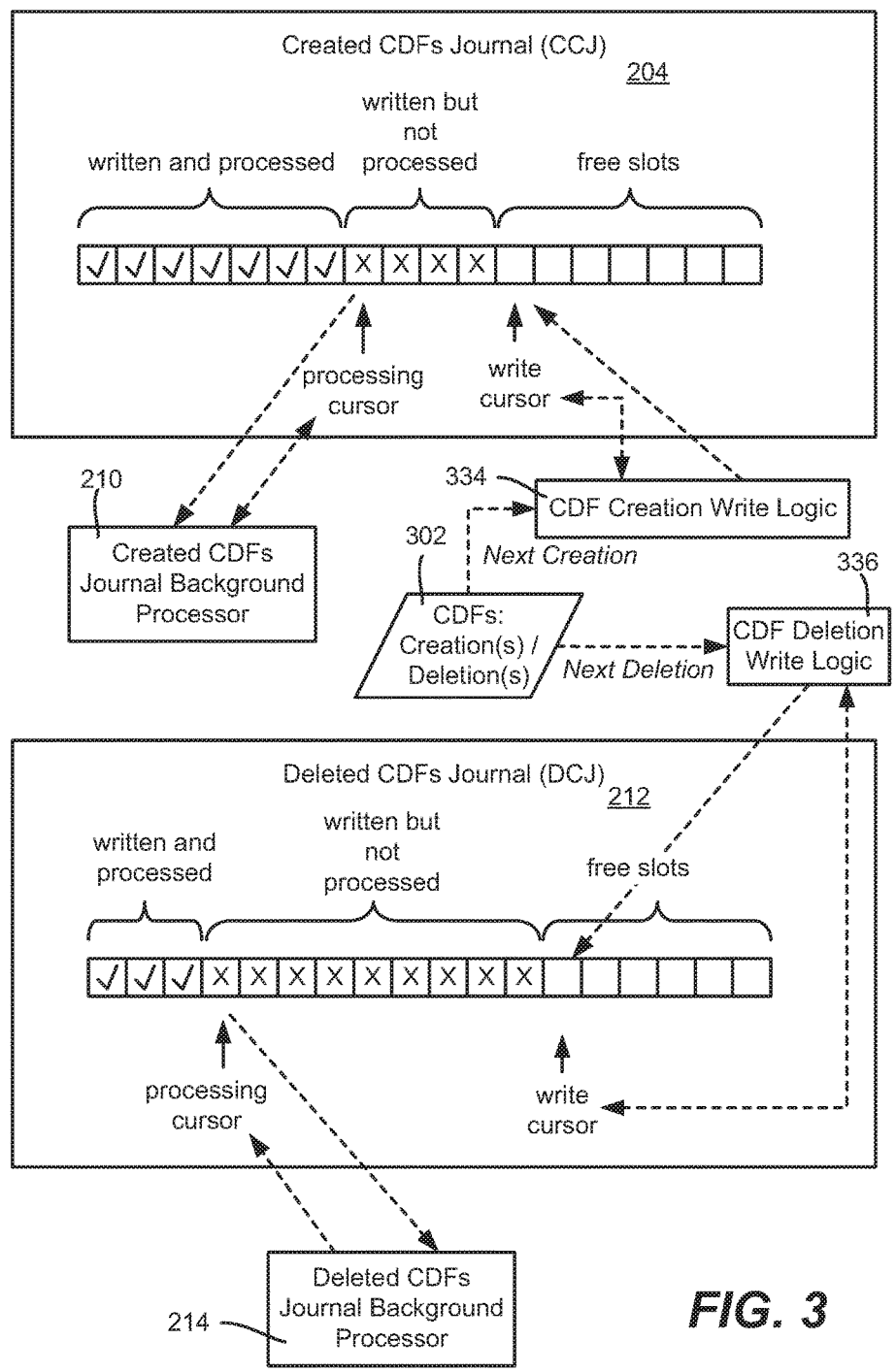
FIG. 3 is an example representation of journal data structures and journal processing, according to one or more example implementations.

FIG. 3 provides further description with respect to the created CDFs journal 204 and the deleted CDFs journal 212.

For the sake of simplicity, it can be assumed that there is one created CDFs journal 204 and one deleted CDFs journal 212 for the entire GEO distributed storage system, although in practice such journals may be implemented as composite journals (which is of no consequence to the technology described herein). In general and as represented in FIG. 3, a journal comprises a stream of entries. For each journal 204 and 212, there is a write cursor that points to the position of the next entry to be entered into the journal, and a processing cursor that points to the position of a written entry that has not yet been processed. Thus, entries behind the processing cursor (e.g., denoted with a check mark "✓" character) have been written and processed whereby they may be cleaned up; the entries ranging from the processing cursor to the write cursor (e.g., denoted with an uppercase "X" character) are the entries to process.

In FIG. 3, for a CDF creation operation, as part of creating the CDF, CDF creation write logic 334 adds an entry to the create CDFs journal 204 at the CDF journal write cursor position. Similarly, for a CDF deletion operation, as part of deleting the CDF, CDF deletion write logic 336 writes an entry at the stream position in the deleted CDs journal 212 corresponding to the write cursor.

In the background processing described with reference to FIG. 2, both the created CDF journal background processor 210 and the deleted CDF journal background processor 214 add BLOB references to the relevant blob reference sets in the directory table object references 208 (FIG. 2). The created CDF journal background processor 210 processor adds positive references, while the deleted CDF journal background processor 214 adds negative references.

Figure 4:
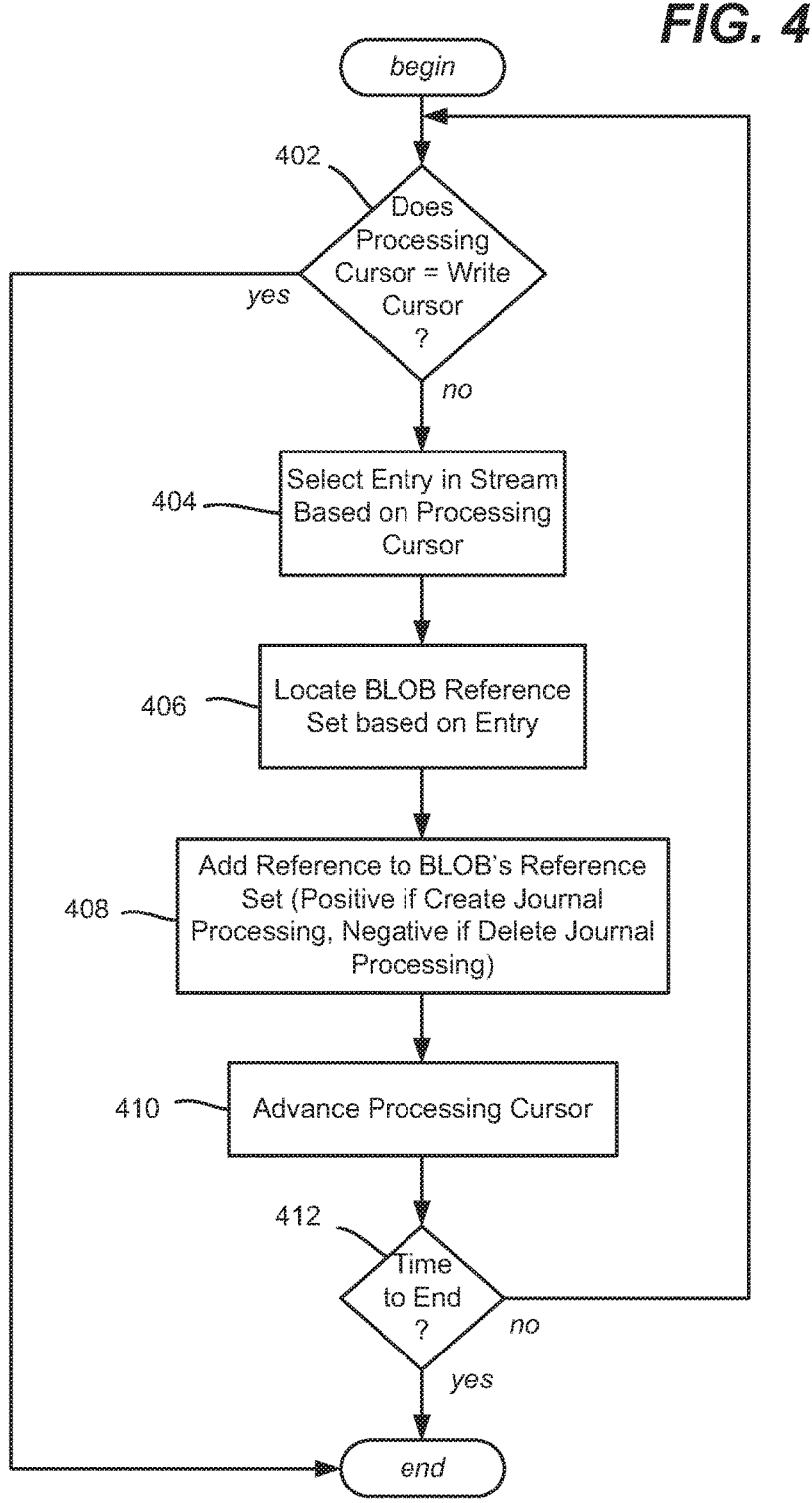
FIG. 4 is an example flow diagram representing example operations exemplified as steps taken by logic that processes a created reference objects journal or deleted reference objects journal, according to one or more example implementations.

FIG. 4 summarizes the logic of a background journal processor (create or delete) by way of example operations exemplified as steps, beginning at step 402 where the background processor evaluates whether the processing cursor position is already at the write cursor position, which if true indicates that no entries need to be processed. If so the background process ends.

If at least one entry needs to be processed, step 404 selects an entry in the stream based on the position of the processing cursor. Step 406 locates the BLOB reference set that corresponds to the entry based on information in the entry. Step 408 adds a reference to the blobs reference set. Note that if the creation journal processor is performing step 408, a positive reference is added to the BLOB's reference set, whereas if the deletion journal processor is performing step 408, a negative references added to the BLOB's reference set. Once processed, step 410 advances the processing cursor to the next entry in the stream of entries.

Because the background process may only operate occasionally, e.g. periodically or on some other triggered basis, step 412 evaluates whether it is time to end the background process based on some ending criteria, e.g., a background time slice is up, some number or percentage of previously unprocessed entries have been processed, and so on. If the inning criteria has not been reached, step 412 returns to step 402 to repeat the process for any unprocessed entry, if any such unprocessed entry remains.

Synchronization of the background processing is relatively complicated in a geographically distributed storage system. For example, it is possible that a negative reference to a BLOB from a CDF is registered before a positive reference for the same BLOB-CDF pair is registered.

Returning to FIG. 2, to avoid such synchronization issues, described herein is a common handler of BLOB reference set updates, referred to as garbage collection handler logic 240. As will be understood, the kind of updates to handle with respect to positive or negative references is irrelevant; only the final state of a BLOB reference set is relevant for garbage collection, e.g., whether the set of positive reference (s) and the set of negative reference(s) for a given BLOB 242 match each other. Note that as described herein, the garbage collection handler logic 240 operates according to the current blob state 244, e.g. the "Alive" or "garbage collection candidate" state. Note further that the garbage collection handler logic 240 is able to obtain and maintain (cache) the created CDF journal write cursor position, as represented by block 246.

Figure 5:
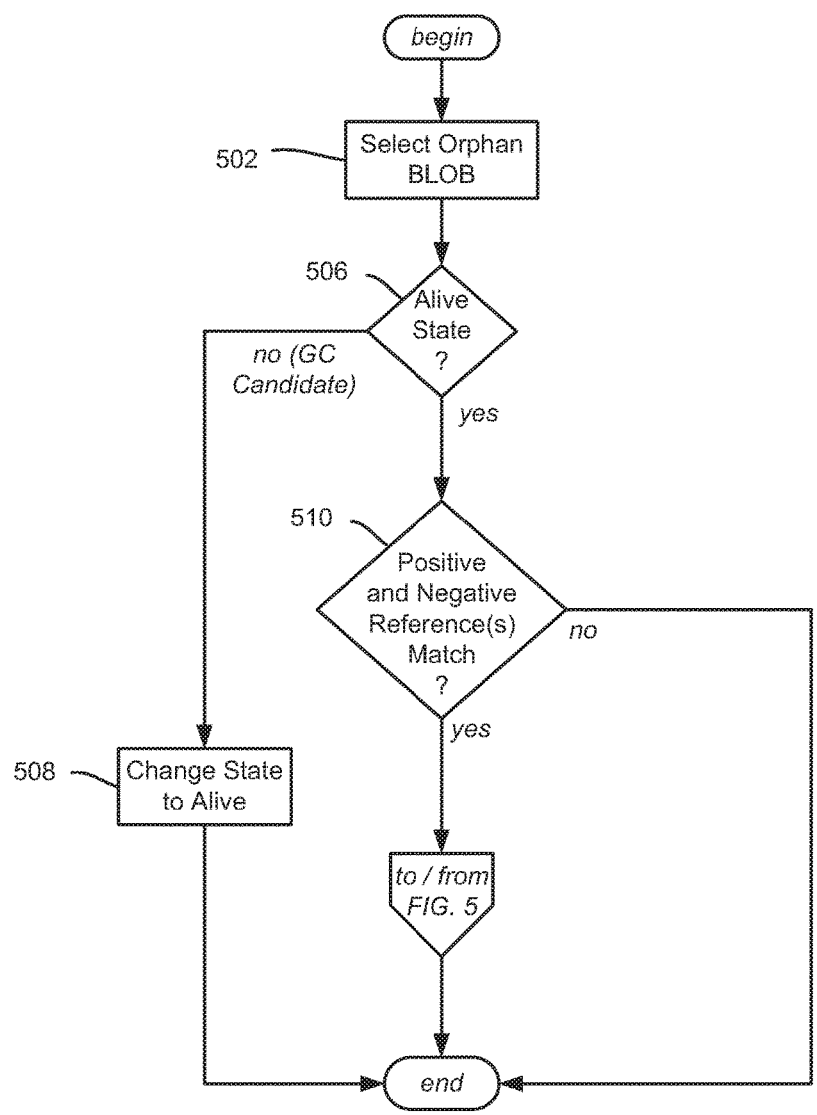
FIGS. 5 and 6 comprise an example flow diagram representing example operations exemplified as steps taken by logic that makes garbage collection-related decisions, according to one or more example implementations.
Figure 6:
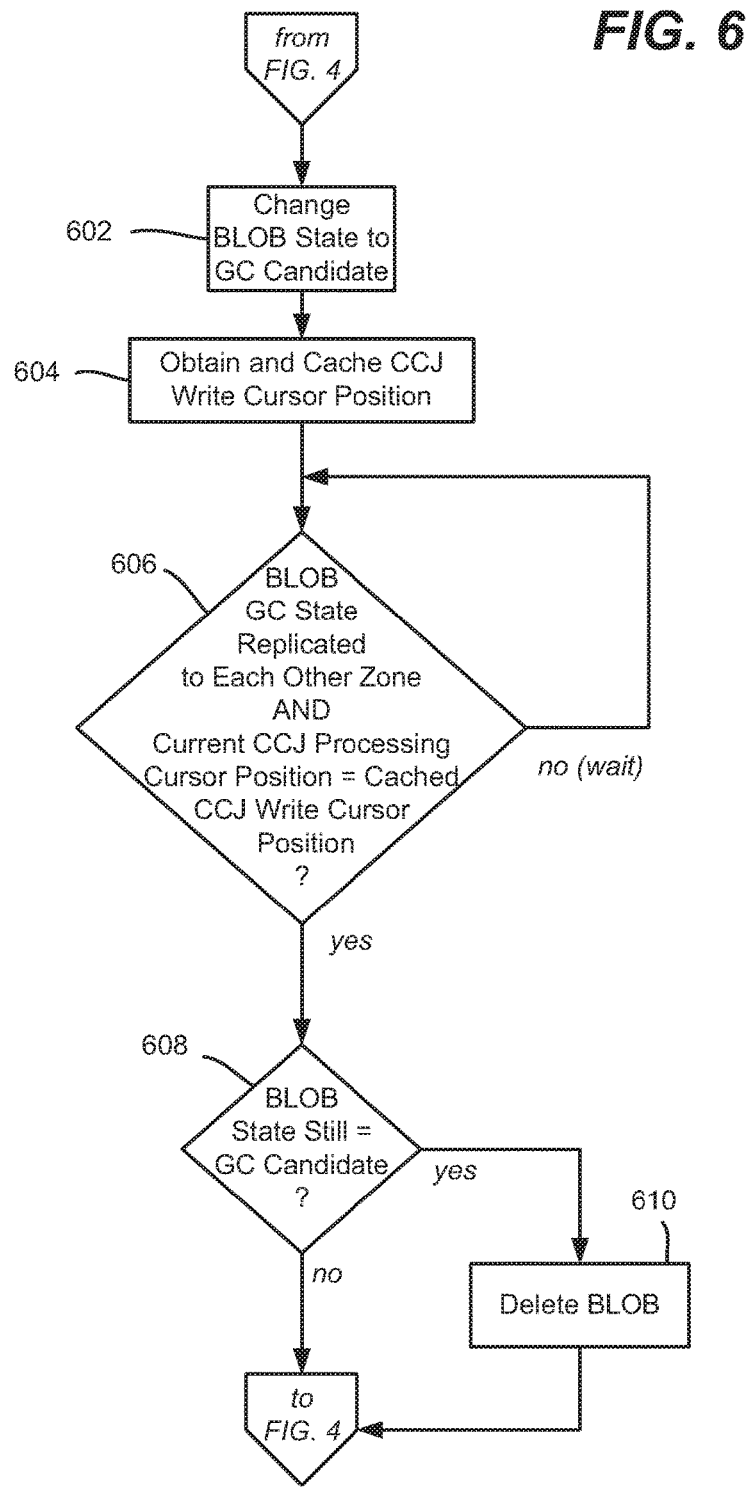

In general, the garbage collection handler logic 240 that processes the BLOB reference set updates implements the logic/operations of FIGS. 5 and 6, exemplified as steps. Step 502 represents selecting an orphan BLOB for which reference set processing is desired.

If at step 506 the BLOB is in the garbage collection candidate state, the garbage collection handler logic 240 switches the BLOB's state back to Alive (step 508), and the process ends for now. If instead at step 506 the BLOB is in the Alive state, the garbage collection handler logic 240 checks the relevant BLOB reference set for this BLOB to determine whether the set of positive references and the set of negative references match each other. If not, no further handling is needed for this BLOB for now. Otherwise, if at step 510 the positive references and the negative references compensate for each other, the garbage collection handler logic 240 operates as represented in FIG. 6.

As represented FIG. 6 via step 602, the garbage collection handler logic 240 switches the BLOB state from the Alive state to the garbage collection candidate state. Step 604 represents obtaining and caching the current created CDF journal (CCJ) write cursor position.

As represented via step 606, the garbage collection handler logic 240 waits for two events, namely that the BLOB's new (garbage collection candidate) state is replicated to each other zone, and that the processing cursor of the created CDFs journal 204 (FIGS. 2 and 3) reaches the cached position of the write cursor. To check for successful replication, the garbage collection handler logic 240 can receive an event from the asynchronous replication logic 126 (FIG. 1) representing the synchronization success for each zone, or the garbage collection handler logic 240 can more directly receive such an event from each zone. Alternatively, if replication occurs on a regular (e.g. periodic) basis, the garbage collection handler logic can wait for a sufficient amount of time while ensuring that no temporary zone outage is occurring. With respect to waiting for the processing cursor to reach the cache position of the write cursor, polling for or other communication to obtain the processing cursor position from the created CDFs journal background processor 210 may be performed.

When both events occur, step 602 checks whether the state of the BLOB is still the garbage collection candidate state, and if true, performs deletion of the BLOB object.

Figure 7:
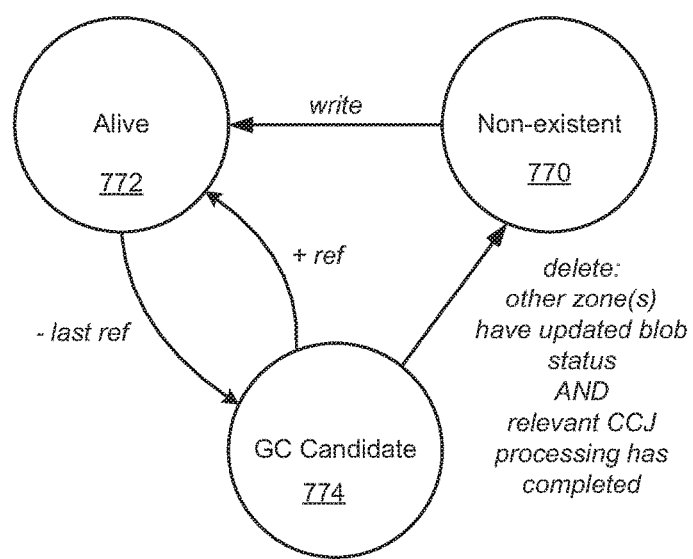
FIG. 7 is an example state diagram representing example states and transitions between states of a binary large object, according to one or more example implementations.

FIG. 7 depicts a state machine of BLOBs in accordance with the logic described above with reference to FIGS. 5 and 6. As can be seen, if a BLOB is in a non-existent state 770, a write operation changes the BLOB to the Alive state 772. Deletion of the last reference changes the blob from the Alive state to the garbage collection (GC) candidate state 774. Addition of a reference when in the garbage collection candidate state 774 changes the BLOB state back to the alive state 772. A BLOB is deleted only when each other zone is updated with the garbage collection candidate state and the relevant created CDF journal processing has completed, that is, is up to date with respect to this BLOB. Note that a deleted BLOB may be later created in the storage system once again, e.g., a BLOB may go from the non-existent state 770 to the Alive state 772.

Figure 8:
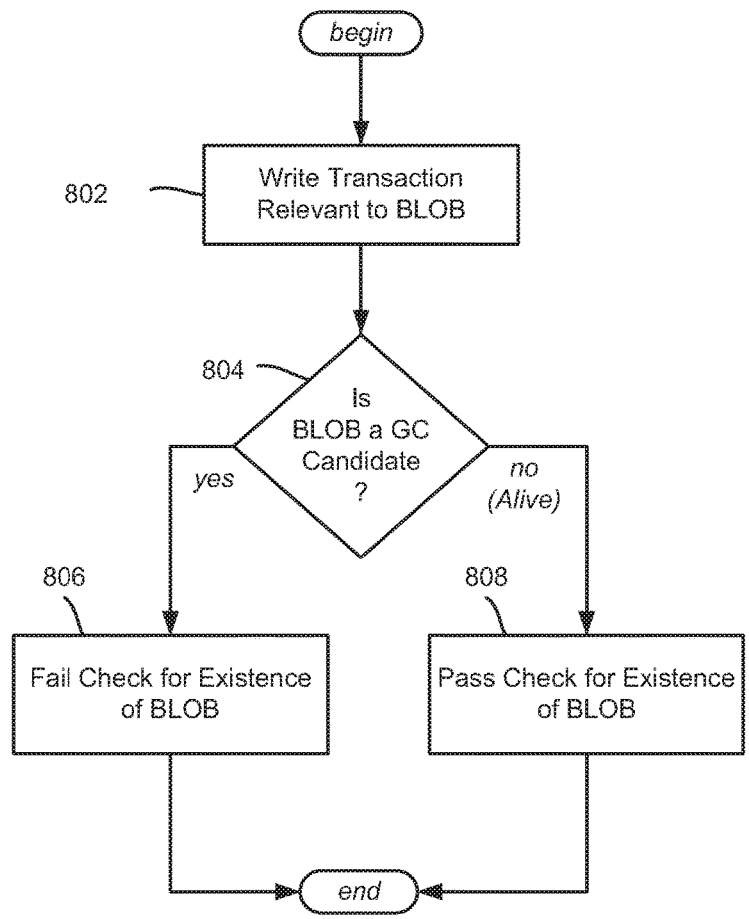
FIG. 8 is an example flow diagram showing example operations exemplified as steps related to evaluating whether a binary large object is a garbage collection candidate for purposes of failing or passing a check for existence of the binary large object, according to one or more example implementations.

The above-described technology for garbage collection guarantees the preservation of BLOBs for applications that operate properly with respect to not deleting an old CDF until a new one is created, when the old CDF and the new one share BLOBs. The check for a BLOB's existence passes (e.g., steps 802, 804 and 808 of FIG. 8) for a new CDF because there is still an old CDF, which keeps the BLOBs in the state Alive. Shared BLOBs never get deleted prematurely because a new CDF is already registered in the created CDFs journal by the time deletion of an old CDF is requested, and a BLOB's deletion is synchronized with the processing of the created CDFs journal.

Still further, the storage system guarantees data integrity for applications that behave freely, (in which such applications may delete an old CDF before a new one is created). An acknowledgement sent to a client for a new CDF guarantees that the BLOBs referenced are still there. If preservation of BLOBs is not guaranteed, the acknowledgement is not sent, which is one reason the check for existence fails (e.g., steps 802, 804 and 806 of FIG. 8) for BLOBs that are garbage collection candidates.

As can be seen, the expensive/slow synchronization between reference tracking garbage collection and CDF writes (if in which each BLOB referenced by a new CDF had to be updated with a new positive reference to it in the foreground of the CDF write transaction) is eliminated. To this end, the technology described herein replaces such expensive updates of the BLOB's reference sets (system metadata) with much cheaper/faster checks for a BLOB's existence. Note further that a standard set of techniques may be used to speed up such checks, such as batch mode processing in which a remote zone may be requested to check for the existence existence for a batch of BLOBs. Another technique may perform local pre-checks, e.g., do not request a remote zone to check for existence of a BLOB if the state of the BLOB available locally is that of a garbage collection candidate as the new CDF write may be rejected right away. Another technique is to reject on a first failure, e.g., there may be no need to check all the BLOBs referenced by a new CDF as a CDF write may be rejected already after a first failure of check for a BLOB's existence.

Further, the technology described herein overcomes the problem of CAS system inoperability during temporary zone outage, in which there is no way to get the status of a BLOB owned by a zone that was temporary unavailable. Previously the storage system had to reject writes of all new CDFs that referenced BLOBs owned by an unavailable zone. Instead, each zone has a reasonable knowledge of the status of each BLOB that belongs to a remote zone. The BLOB state, which is available locally, may be used in that it is not safe to reference a BLOB in the garbage collection candidate state because the BLOB may be gone already. Thus, any new CDFs that reference such BLOBs must be rejected. There is some probability of false CDF rejection; however this probability is very low and this unlikely problem impacts mostly applications that behave freely/improperly with respect to CDF operations. The impact on applications that act properly is minimal and is deemed acceptable for a zone outage scenario. Conversely, it is safe to reference a BLOB in the Alive state because a BLOB is not physically removed until its garbage collection candidate state is propagated to each other zone. If the true state of a BLOB is that of a garbage collection candidate, the conflict may be resolved during reconciliation phase, which follows temporary zone outage; such BLOBs become alive during reconciliation. Thus the geographically distributed storage system is fully operable during temporary zone outages.

As can be seen, the technology described herein provides for garbage collection of CAS data objects, referred to as BLOBs within ECS™ that are referenced by referencing data objects, referred to as CDFs within ECS™. In a geographically distributed system, a CDF created in a first zone may reference a BLOB owned by a second ECS zone, and described herein is a reference tracking garbage collection technology for geographically distributed systems that assures CAS data integrity without severe impact on CDF write operations and storage system operability during a temporary zone outage.

Figure 9:
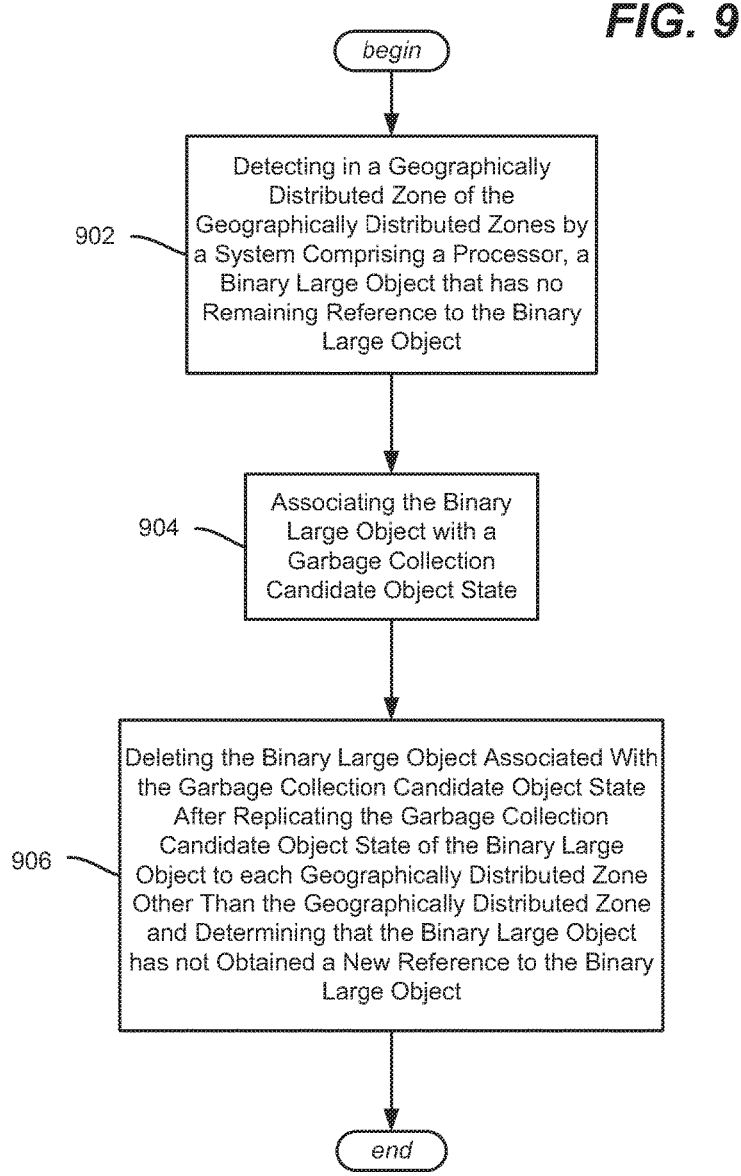
FIG. 9 is an example flow diagram showing example operations related to reference tracking garbage collection, according to one or more example implementations.

One or more aspects are represented as example operations in FIG. 9, and operate in a geographically distributed data storage system comprising geographically distributed zones, comprising detecting (operation 902), in a geographically distributed zone of the geographically distributed zones by a system comprising a processor, a binary large object that has no remaining reference to the binary large object. Operation 904 represents associating the binary large object with a garbage collection candidate object state. Operation 906 represents deleting the binary large object associated with the garbage collection candidate object state after replicating the garbage collection candidate object state of the binary large object to each geographically distributed zone other than the geographically distributed zone and determining that the binary large object has not obtained a new reference to the binary large object.

Replicating the garbage collection candidate object state of the binary large object to each geographically distributed zone other than the geographically distributed zone may comprise determining that no zone of the geographically distributed zones is experiencing a temporary zone outage.

Determining that the binary large object has not obtained a new reference to the binary large object may comprise evaluating each reference object of first reference objects that have been created and are determined to be capable of referencing the binary large object after creation of the first reference objects, and evaluating each reference object of second reference objects that have been deleted and are determined to have been capable of the referencing of the binary large object before deletion of the second reference objects. Evaluating each reference object of the first reference objects that have been created may comprise determining that a creation data structure is up to date, wherein the creation data structure is representative of created objects, including the first reference objects, that have been determined to be capable of the referencing of the binary large object. Aspects may comprise adding a first respective entry to a creation data structure for each reference object of the first reference objects, and adding a second respective entry to a deletion data structure for each reference object of the second reference objects, wherein the evaluating each reference object of the first reference objects may comprise processing the creation data structure, and wherein the evaluating each reference object of the second reference objects may comprise processing the deletion data structure. Processing the creation data structure may comprise adding a positive reference to a reference set associated with the binary large object in response to a first entry in the creation data structure indicating that a first reference object that references the binary large object has been created, and wherein the processing the deletion data structure may comprise adding a negative reference to the reference set associated with the binary large object in response to a second entry in the deletion data structure indicating that a second reference object that referenced the binary large object has been deleted. Determining that the binary large object has not obtained the reference to the binary large object may comprise determining that each positive reference of the creation data structure matches a negative reference.

Aspects may comprise receiving a request to check for existence of the binary large object, determining that the binary large object is associated with the garbage collection candidate object state, and failing the check for existence.

Figure 10:
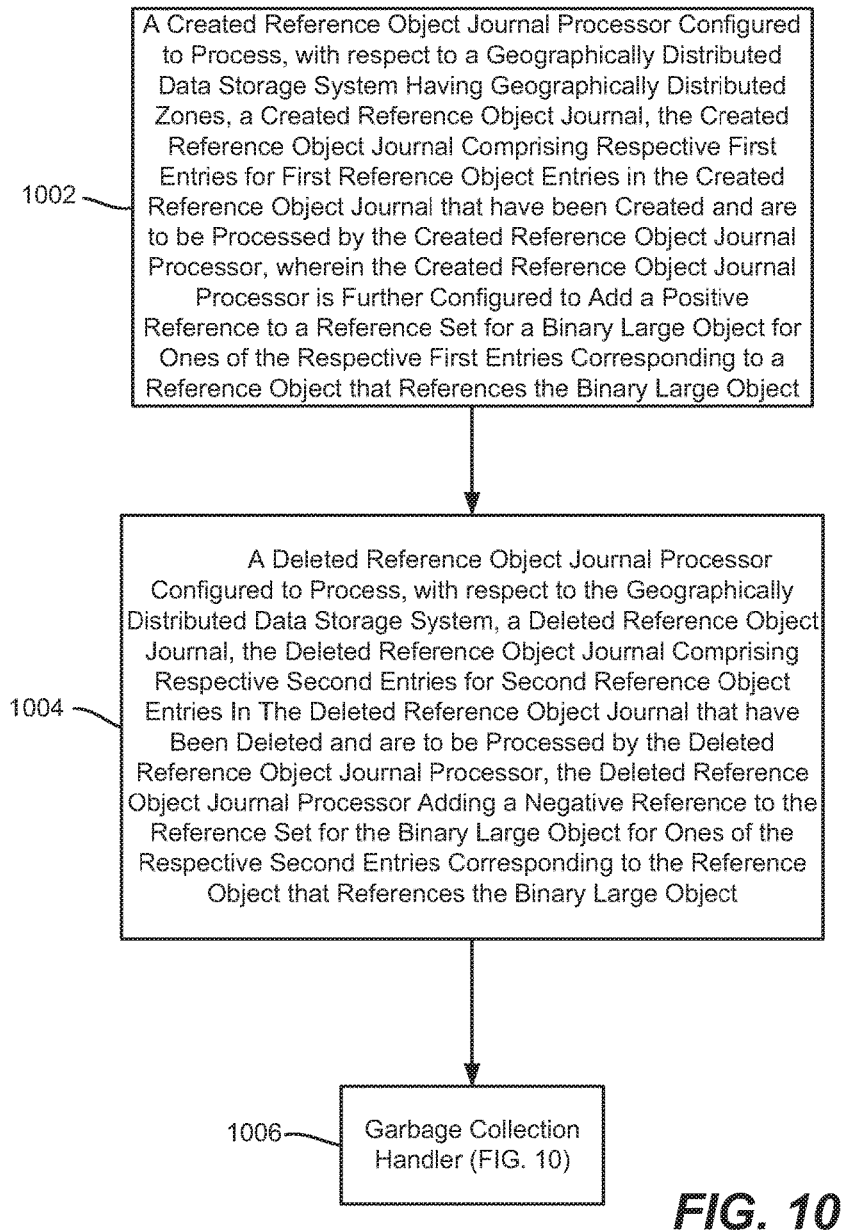
FIGS. 10 and 11 comprise an example block diagram showing example logic components related to reference tracking garbage collection, according to one or more example implementations.
Figure 11:
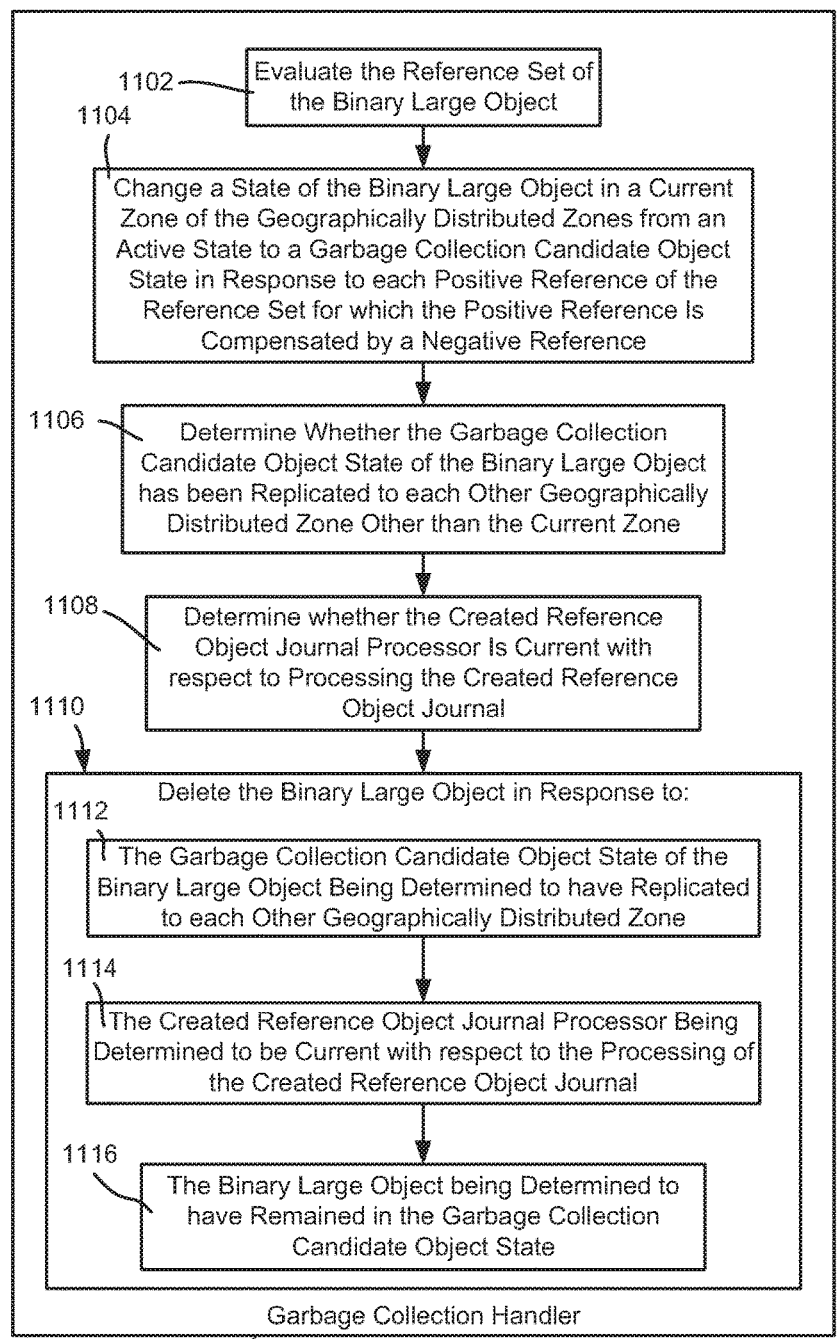

One or more aspects, depicted as example blocks in FIGS. 10 and 11, comprise a created reference object journal processor (block 1002 of FIG. 10) configured to process, with respect to a geographically distributed data storage system having geographically distributed zones, a created reference object journal, the created reference object journal comprising respective first entries for first reference object entries in the created reference object journal that have been created and are to be processed by the created reference object journal processor, wherein the created reference object journal processor is further configured to add a positive reference to a reference set for a binary large object for ones of the respective first entries corresponding to a reference object that references the binary large object. A deleted reference object journal processor (block 1004) is configured to process, with respect to the geographically distributed data storage system, a deleted reference object journal, the deleted reference object journal comprising respective second entries for second reference object entries in the deleted reference object journal that have been deleted and are to be processed by the deleted reference object journal processor, the deleted reference object journal processor adding a negative reference to the reference set for the binary large object for ones of the respective second entries corresponding to the reference object that references the binary large object. Aspects comprise a garbage collection handler (block 1004) configured to evaluate the reference set of the binary large object (block 1102, FIG. 11), change a state of the binary large object in a current zone of the geographically distributed zones from an active state to a garbage collection candidate object state in response to each positive reference of the reference set for which the positive reference is compensated by a negative reference (block 1104), determine whether the garbage collection candidate object state of the binary large object has been replicated to each other geographically distributed zone other than the current zone (block 1106), and determine whether the created reference object journal processor is current with respect to processing the created reference object journal (block 1108). Block 1110 represents logic to delete the binary large object in response to the garbage collection candidate object state of the binary large object being determined to have replicated to each other geographically distributed zone (block 1112), the created reference object journal processor being determined to be current with respect to the processing of the created reference object journal (block 1114), and the binary large object being determined to have remained in the garbage collection candidate object state (block 1116).

The garbage collection handler may be further configured to save, in a cached write position, a position of a write cursor in the created reference object journal, and determine that the created reference object journal processor is current with respect to the processing of the created reference object journal in response to a current processing cursor position in the created reference object journal being determined to have reached the position of the cached write position of the write cursor.

The binary large object may be a content addressed storage data object. The binary large object may be a content addressed storage data object, and wherein the reference object that references the binary large object comprises a c-clip descriptor file. The geographically distributed data storage system may be configured to receive a check for existence of the binary large object, determine that the binary large object is associated with the garbage collection candidate object state, and fail the check for existence. The geographically distributed data storage system may be configured to add an entry for a reference object to the created reference object journal before performing the check for the existence of the binary large object. The garbage collection handler may be configured to determine whether the created reference object journal processor is current with respect to processing the created reference object journal by checking a cached position of a write cursor of the created reference object journal against a current position of a processing cursor of the created reference object journal.

Figure 12:
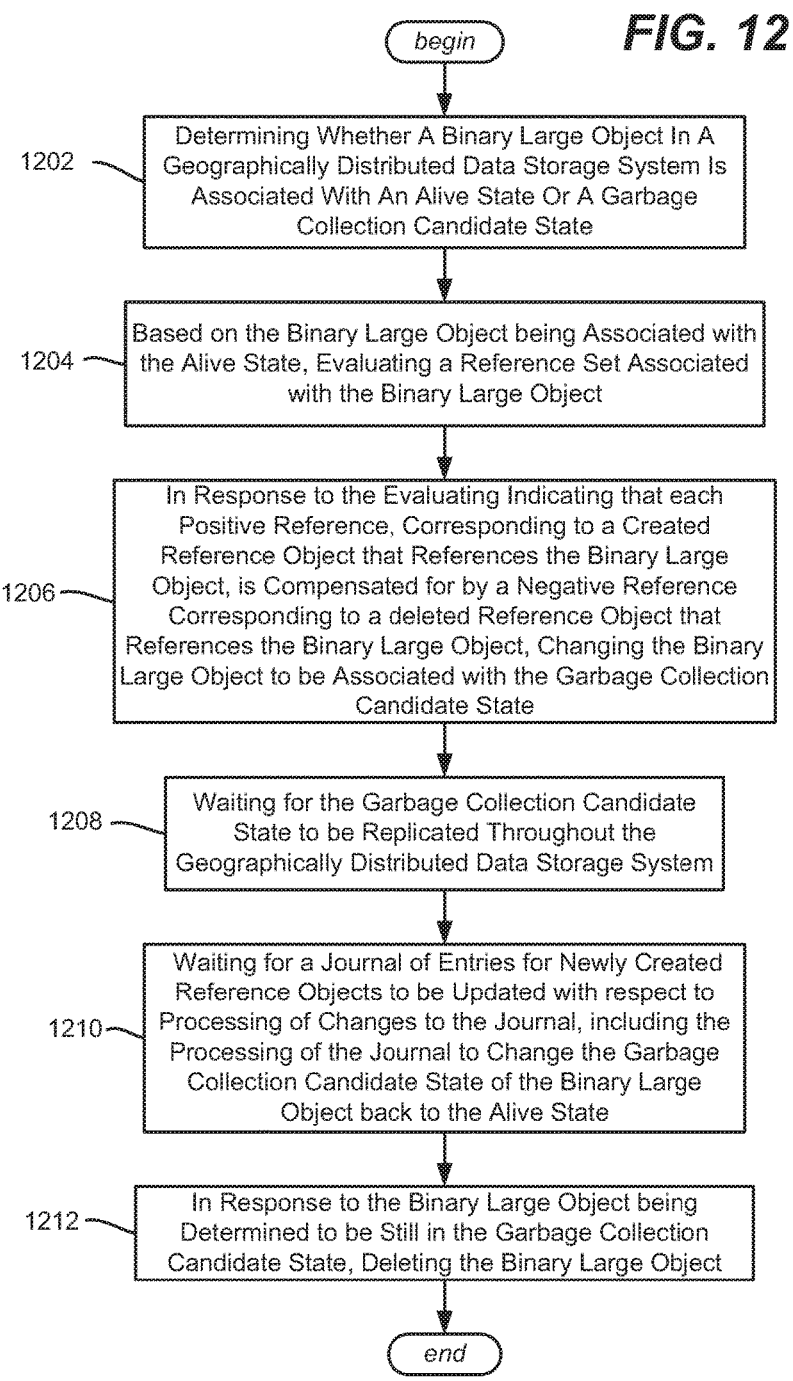
FIG. 12 is an example flow diagram showing example operations related to reference tracking garbage collection, according to one or more example implementations.

One or more aspects, depicted as example operations in FIG. 12 (and which may not be in the order presented), comprise determining (operation 1202) whether a binary large object in a geographically distributed data storage system is associated with an alive state or a garbage collection candidate state. Based on the binary large object being associated with the alive state, operation 1204 represents evaluating a reference set associated with the binary large object. Operation 1206 represents, in response to the evaluating indicating that each positive reference, corresponding to a created reference object that references the binary large object, is compensated for by a negative reference corresponding to a deleted reference object that references the binary large object, changing the binary large object to be associated with the garbage collection candidate state, waiting for the garbage collection candidate state to be replicated throughout the geographically distributed data storage system (operation 1208), and waiting for a journal of entries for newly created reference objects to be updated with respect to processing of changes to the journal, including the processing of the journal to change the garbage collection candidate state of the binary large object back to the alive state (operation 1210). In response to the binary large object being determined to be still in the garbage collection candidate state, operation 1212 represents deleting the binary large object.

One or more other aspects may comprise, in response to the evaluating indicating that a positive reference, corresponding to the created reference object that references the binary large object, is not compensated for by the negative reference, maintaining the binary large object in association with the alive state.

Determining whether the binary large object is associated with the alive state or the garbage collection candidate state may comprise determining that the binary large object is in the garbage collection candidate state, and wherein the operations may further comprise changing the binary large object to be associated with the alive state.

Further operations may comprise receiving a check for existence of the binary large object, and failing the check for existence as a result of determining that the binary large object is associated with the garbage collection candidate object state. Further operations may comprise adding an entry for a reference object to a created reference object journal before performing the check for the existence of the binary large object.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
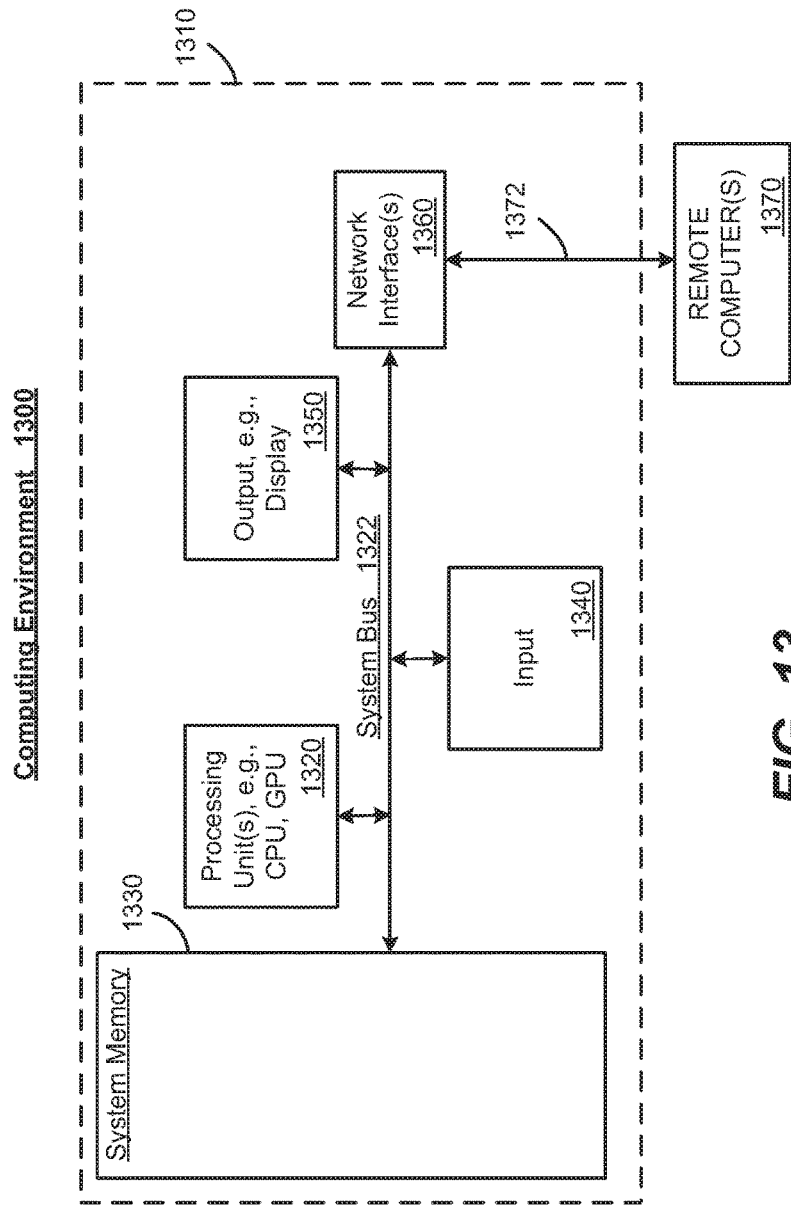
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth. By way of example, and not limitation, system memory 1330 may also include an operating system, application programs, other program modules, and program data.

A user can enter commands and information into the computer 1310 through one or more input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
  in a geographically distributed data storage system comprising geographically distributed zones, detecting, in a geographically distributed zone of the geographically distributed zones by a system comprising a processor, a binary large object that has no remaining reference to the binary large object;
  associating the binary large object with a garbage collection candidate object state; and
  deleting the binary large object associated with the garbage collection candidate object state after replicating the garbage collection candidate object state of the binary large object to each geographically distributed zone other than the geographically distributed zone and determining that the binary large object has not obtained a new reference to the binary large object,
  wherein the determining that the binary large object has not obtained the new reference to the binary large object comprises evaluating first reference objects that have been created and are determined to be capable of referencing the binary large object after creation of the first reference objects, and evaluating second reference objects that have been deleted and are determined to have been capable of the referencing of the binary large object before deletion of the second reference objects.

2. The method of claim 1, wherein the replicating the garbage collection candidate object state of the binary large object to each geographically distributed zone other than the geographically distributed zone comprises determining that no zone of the geographically distributed zones is experiencing a temporary zone outage.

3. The method of claim 1, wherein the evaluating the first reference objects that have been created comprises determining that a creation data structure is up to date, wherein the creation data structure is representative of created objects, including the first reference objects, that have been determined to be capable of the referencing of the binary large object.

4. The method of claim 1, further comprising, adding a first respective entry to a creation data structure for each reference object of the first reference objects, and adding a second respective entry to a deletion data structure for each reference object of the second reference objects, wherein the evaluating the first reference objects comprises processing the creation data structure, and wherein the evaluating the second reference objects comprises processing the deletion data structure.

5. The method of claim 4, wherein the processing the creation data structure comprises adding a positive reference to a reference set associated with the binary large object in response to a first entry in the creation data structure indicating that a first reference object that references the binary large object has been created, and wherein the processing the deletion data structure comprises adding a negative reference to the reference set associated with the binary large object in response to a second entry in the deletion data structure indicating that a second reference object that referenced the binary large object has been deleted.

6. The method of claim 5, wherein the determining that the binary large object has not obtained the reference to the binary large object comprises determining that each positive reference of the creation data structure matches a negative reference.

7. The method of claim 1, further comprising, receiving a request to check for existence of the binary large object, determining that the binary large object is associated with the garbage collection candidate object state, and failing the check for existence.

8. A system, comprising:
  a created reference object journal processor configured to process, with respect to a geographically distributed data storage system having geographically distributed zones, a created reference object journal, the created reference object journal comprising respective first entries for first reference object entries in the created reference object journal that have been created and are to be processed by the created reference object journal processor, wherein the created reference object journal processor is further configured to add a positive reference to a reference set for a binary large object for ones of the respective first entries corresponding to a reference object that references the binary large object;

a deleted reference object journal processor configured to process, with respect to the geographically distributed data storage system, a deleted reference object journal, the deleted reference object journal comprising respective second entries for second reference object entries in the deleted reference object journal that have been deleted and are to be processed by the deleted reference object journal processor, the deleted reference object journal processor adding a negative reference to the reference set for the binary large object for at least one of the respective second entries corresponding to the reference object that references the binary large object; and a garbage collection handler configured to:
evaluate the reference set of the binary large object,
change a state of the binary large object in a current zone of the geographically distributed zones from an active state to a garbage collection candidate object state in response to each positive reference of the reference set for which the positive reference is compensated by a negative reference,
determine whether the garbage collection candidate object state of the binary large object has been replicated to each other geographically distributed zone other than the current zone,
determine whether the created reference object journal processor is current with respect to processing the created reference object journal, and
delete the binary large object in response to:
the garbage collection candidate object state of the binary large object being determined to have replicated to each other geographically distributed zone,
the created reference object journal processor being determined to be current with respect to the processing of the created reference object journal, and
the binary large object being determined to have remained in the garbage collection candidate object state.

9. The system of claim 8, wherein the garbage collection handler is further configured to save, in a cached write position, a position of a write cursor in the created reference object journal, and determine that the created reference object journal processor is current with respect to the processing of the created reference object journal in response to a current processing cursor position in the created reference object journal being determined to have reached the position of the cached write position of the write cursor.

10. The system of claim 8, wherein the binary large object is a content addressed storage data object.

11. The system of claim 8, wherein the binary large object is a content addressed storage data object, and wherein the reference object that references the binary large object comprises a c-clip descriptor file.

12. The system of claim 8, wherein the geographically distributed data storage system is configured to receive a check for existence of the binary large object, determine that the binary large object is associated with the garbage collection candidate object state, and fail the check for existence.

13. The system of claim 12, wherein the geographically distributed data storage system is configured to add an entry for a reference object to the created reference object journal before performing the check for the existence of the binary large object.

14. The system of claim 8, wherein the garbage collection handler is configured to determine whether the created reference object journal processor is current with respect to processing the created reference object journal by checking a cached position of a write cursor of the created reference object journal against a current position of a processing cursor of the created reference object journal.

15. A machine-readable storage medium, comprising executable instructions that, when executed by a processor, facilitate performance of operations, the operations comprising:
determining whether a binary large object in a geographically distributed data storage system is associated with an alive state or a garbage collection candidate state; and
based on the binary large object being associated with the alive state,
evaluating a reference set associated with the binary large object, and
in response to the evaluating indicating that each positive reference, corresponding to a created reference object that references the binary large object, is compensated for by a negative reference corresponding to a deleted reference object that references the binary large object,
changing the binary large object to be associated with the garbage collection candidate state,
waiting for the garbage collection candidate state to be replicated throughout the geographically distributed data storage system,
waiting for a journal of entries for newly created reference objects to be updated with respect to processing of changes to the journal, including the processing of the journal to change the garbage collection candidate state of the binary large object back to the alive state,
in response to the binary large object being determined to be still in the garbage collection candidate state, deleting the binary large object.

16. The machine-readable storage medium of claim 15, wherein the operations further comprise:
in response to the evaluating indicating that the positive reference, corresponding to the created reference object that references the binary large object, is not compensated for by the negative reference, maintaining the binary large object in association with the alive state.

17. The machine-readable storage medium of claim 15, wherein the determining whether the binary large object is associated with the alive state or the garbage collection candidate state comprises determining that the binary large object is in the garbage collection candidate state, and wherein the operations further comprise changing the binary large object to be associated with the alive state.

18. The machine-readable storage medium of claim 15, wherein the operations further comprise receiving a check for existence of the binary large object, and failing the check for existence as a result of determining that the binary large object is associated with the garbage collection candidate object state.

19. The machine-readable storage medium of claim 18, wherein the operations further comprise adding an entry for a reference object to a created reference object journal before performing the check for the existence of the binary large object.

20. The machine-readable storage medium of claim 15, wherein the binary large object is a content addressed storage data object.

* * * * *